United States Patent
Segal et al.

(10) Patent No.: US 12,483,581 B1
(45) Date of Patent: Nov. 25, 2025

(54) SYSTEM AND METHOD FOR EXPOSED SOFTWARE SERVICE DETECTION

(71) Applicant: Wiz, Inc., New York, NY (US)

(72) Inventors: Assaf Segal, Tel Aviv (IL); Shir Tamari, Tel Aviv (IL); Amir Lande Blau, Tel Aviv (IL); Arnon Trabelsi, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/222,564

(22) Filed: May 29, 2025

(51) Int. Cl.
*G06F 21/55* (2013.01)
*H04L 9/40* (2022.01)

(52) U.S. Cl.
CPC ........ *H04L 63/1425* (2013.01); *G06F 21/554* (2013.01); *G06F 2221/034* (2013.01)

(58) Field of Classification Search
None
See application file for complete search history.

(56) References Cited

U.S. PATENT DOCUMENTS

| | | |
|---|---|---|
| 10,200,389 B2 | 2/2019 | Rostamabadi et al. |
| 11,683,333 B1 | 6/2023 | Dominessy et al. |
| 2020/0213357 A1* | 7/2020 | Levin ............... H04L 63/20 |
| 2021/0099483 A1 | 4/2021 | Shukla |
| 2023/0009127 A1 | 1/2023 | Boyer |
| 2024/0403437 A1* | 12/2024 | Szigeti ............... G06F 21/577 |
| 2025/0193561 A1* | 6/2025 | Kumar ............... H04L 67/02 |

* cited by examiner

*Primary Examiner* — Craig C Dorais
(74) *Attorney, Agent, or Firm* — M&B IP Analysts, LLC

(57) ABSTRACT

A method and system for detecting an exposed software service in a cloud computing environment is presented. The method includes detecting a plurality of resources in the cloud computing environment, wherein each resource is deployed in the cloud computing environment; associating each resource of the plurality of resources with a software service; detecting a plurality of Application Programming Interface (API) endpoints, each API endpoint associated with at least a resource of the plurality of resources; detecting an exposed API endpoint from the plurality of API endpoints based on executing a network access instruction on an API endpoint; determining that the software service is exposed in response to determining that a resource associated with the exposed API endpoint is associated with the software service; and initiating a mitigation action in response to determining that the software service is exposed.

19 Claims, 7 Drawing Sheets

SYSTEM AND METHOD FOR EXPOSED SOFTWARE SERVICE DETECTION

TECHNICAL FIELD

The present disclosure relates generally to the field of cybersecurity threat detection and specifically to the detection of exposed software services.

BACKGROUND

An API is a mechanism that enables two software components to communicate with each other using a set of definitions and protocols. There are multiple types of APIs such as a Simple Object Access Protocol (SOAP) API, a Remote Procedure Call (RPC) API, a Websocket API, and a Representational State Transfer (REST) API.

API endpoints are final touchpoints in the API communication system. These include server Uniform Resource Locators (URLs), services, and other digital locations where the information is sent and received between systems. API endpoints are specific URLs where a client can access an API. API endpoints serve as an authorized entryway that enables applications to interact with services, retrieve data, and perform various functions.

Since these API endpoints expose sensitive information and allow access to critical systems, they are prone to cybersecurity attacks. Thus, API endpoint security is essential to protect sensitive data, prevent data leaks, prevent unauthorized network access, prevent data manipulation, and misuse.

Challenges in the field of endpoint security include the lack of visibility in detecting endpoints. Reasons for the lack of visibility in detecting endpoints are that endpoints are not static and change dynamically. Furthermore, the use of API gateways and proxies obstruct endpoint detection by acting as the front interface for network traffic. Further, API gateways route the network traffic to different backend services, hiding the actual API endpoints from external view.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include detecting a plurality of resources in the cloud computing environment, where each resource is deployed in the cloud computing environment; associating each resource of the plurality of resources with a software service; detecting a plurality of Application Programming Interface (API) endpoints, each API endpoint associated with at least a resource of the plurality of resources; detecting an exposed API endpoint from the plurality of API endpoints based on executing a network access instruction on an API endpoint; determining that the software service is exposed in response to determining that a resource associated with the exposed API endpoint is associated with the software service; and initiating a mitigation action in response to determining that the software service is exposed. Other embodiments of this aspect include corresponding computer systems, apparatus, and computer programs recorded on one or more computer storage devices, each configured to perform the actions of the methods.

Implementations may include one or more of the following features. The method may include: generating a representation of the cloud computing environment in a security database, the representation including: a representation of each resource, a representation of each API endpoint, and a representation of the software service. The method where determining that the software service is exposed further may include: querying the security database to detect a representation of an API endpoint connected to a representation of a resource, where the representation of the resource is connected to a representation of a software service. The method where the representation of the API endpoint indicates that the API endpoint is an exposed API endpoint. The method where detecting an exposed API endpoint further may include: determining that the API endpoint is an exposed API endpoint in response to receiving a predetermined result of executing the network access instruction. The method where associating each resource with a software service further may include: detecting an event including an identifier of a first resource and an identifier of a second resource; and associating the first resource and the second resource with the software service in response to determining that the event is of a predetermined type. The method may include: determining that the exposed API endpoint is remediated by the mitigation action; and determining that the exposed software service is not exposed in response to detecting the remediation. The method may include: initiating inspection of each resource of the plurality of resources; and detecting at least a portion of the plurality of API endpoints based on a result of the initiated inspection. The method where inspection includes: generating an inspectable disk; and initiating static analysis on the inspectable disk to detect an API endpoint. The method may include: detecting at least another portion of the API endpoints from runtime events, each runtime event detected by a sensor configured to detect runtime events on a resource. Implementations of the described techniques may include hardware, a method or process, or a computer-tangible medium.

In one general aspect, a non-transitory computer-readable medium may include one or more instructions that, when executed by one or more processing circuitries of a device, cause the device to: detect a plurality of resources in the cloud computing environment, where each resource is deployed in the cloud computing environment. A non-transitory computer-readable medium may also associate each resource of the plurality of resources with a software service. The medium may furthermore include detect a plurality of Application Programming Interface (API) endpoints, each API endpoint associated with at least a resource of the plurality of resources detect an exposed API endpoint from the plurality of API endpoints based on executing a network access instruction on an API endpoint determine that the software service is exposed in response to determining that a resource associated with the exposed API endpoint is associated with the software service; and initiate a mitigation action in response to determining that the software service is exposed. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: detect a plurality of resources in the cloud computing environment, where each resource is deployed in the cloud computing environment. The system may in addition associate each resource of the plurality of resources with a software service. The system may moreover detect a plurality of Application Programming Interface (API) endpoints, each API endpoint associated with at least a resource of the plurality of resources. The system may also detect an exposed API endpoint from the plurality of API endpoints based on executing a network access instruction on an API endpoint. The system may furthermore determine that the software service is exposed in response to determining that a resource associated with the exposed API endpoint is associated with the software service. The system may in addition initiate a mitigation action in response to determining that the software service is exposed. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: generate a representation of the cloud computing environment in a security database, the representation including: a representation of each resource, a representation of each API endpoint, and a representation of the software service. The system where the memory contains further instructions that, when executed by the processing circuitry for determining that the software service is exposed, further configure the system to: query the security database to detect a representation of an API endpoint connected to a representation of a resource, where the representation of the resource is connected to a representation of a software service. The system where the representation of the API endpoint indicates that the API endpoint is an exposed API endpoint. The system where the memory contains further instructions that, when executed by the processing circuitry for detecting an exposed API endpoint, further configure the system to: determine that the API endpoint is an exposed API endpoint in response to receiving a predetermined result of executing the network access instruction. The system where the memory contains further instructions that, when executed by the processing circuitry for associating each resource with a software service, further configure the system to: detect an event including an identifier of a first resource and an identifier of a second resource; and associate the first resource and the second resource with the software service in response to determining that the event is of a predetermined type. The system where the memory contains further instructions which when executed by the processing circuitry further configure the system to: determine that the exposed API endpoint is remediated by the mitigation action; and determine that the exposed software service is not exposed in response to detecting the remediation. The system where the memory contains further instructions which when executed by the processing circuitry further configure the system to: initiate inspection of each resource of the plurality of resources; and detect at least a portion of the plurality of API endpoints based on a result of the initiated inspection. The system where inspection includes: generating an inspectable disk; and initiating static analysis on the inspectable disk to detect an API endpoint. The system where the memory contains further instructions which when executed by the processing circuitry further configure the system to: detect at least another portion of the API endpoints from runtime events, each runtime event detected by a sensor configured to detect runtime events on a resource. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
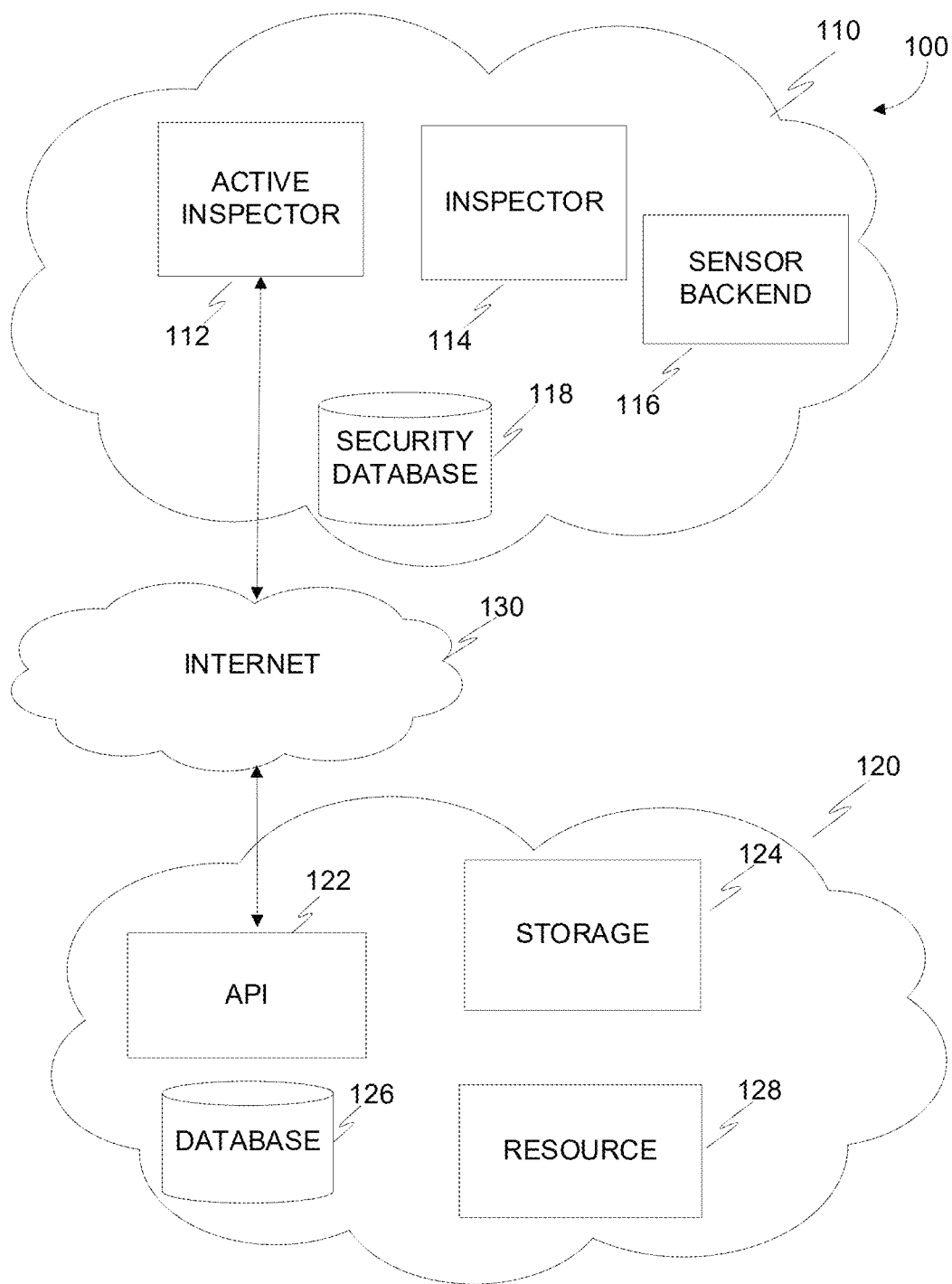
FIG. 1 is an example schematic diagram of a software service monitored for a cybersecurity threat by an inspection environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method for exposed software service detection in a cloud computing environment. It is advantageous to accurately detect exposed software services as they provide valuable insight for the detection and prevention of potential cybersecurity threats, vulnerabilities, data breaches, and the like.

FIG. 1 is an example schematic diagram 100 of a software service 120 monitored for a cybersecurity threat by an inspection environment 110, implemented in accordance with an embodiment.

In various embodiments, a software service 120 is deployed in a cloud computing environment. In an embodiment, a cloud computing environment is implemented as a virtual private cloud (VPC), Virtual Network (VNet), and the like, over a cloud computing platform. A cloud computing platform may be provided, for example, by Amazon® Web Services (AWS), Google® Cloud Platform (GCP), Microsoft® Azure, and the like.

In various embodiments, a software service 120 is a software application, a set of software functionalities, and the like, which provides a service for a principal within the cloud computing environment. In some embodiments, a software service is a cloud service, a web service, a Software as a Service (SaaS), a Platform as a Service (PaaS), and the like. In some embodiments, a software service 120 includes a plurality of cloud entities that are deployed as components of the software service 120.

In certain embodiments, a cloud entity is a compute resource, such as a processor, a storage, a memory, and the like. In an embodiment, a cloud entity is a network component, a virtual machine, a cloud service, an application, and the like. In an embodiment, cloud entities include an Application Programming Interface (API) 122, a database 126, a storage 124, a resource 128, and the like, of which are deployed as part of the software service 120.

In some embodiments, a resource 128 is a virtual machine, a software container, a serverless function, a combination thereof, and the like. In an embodiment, a resource 128 is a software application, such as a webserver, a gateway, a load balancer, a web application firewall (WAF), an appliance, and the like. In various embodiments, cloud entities are configured to be deployed on the resource 128, for example, as nested entities.

In various embodiments, the API 122 is configured to enable multiple systems, components (e.g., software components), principals, cloud entities, resources, hardware components, and the like, to communicate with the software service 120, a component of the software service, etc., using a set of definitions, protocols, rules, policies, and the like.

In some embodiments, the API 122 is configured to facilitate communications between systems, components, principals, cloud entities, software services, and the like, utilizing the internet 130.

In some embodiments, the API 122, a workload (e.g., server) hosting the API 122, and a combination thereof, are configured to receive an API call from a system, resource, component, application, software service, a combination thereof, and the like, of the cloud computing environment. In an embodiment, an API call is a request from an application, a client, component, system, and the like, that passes through the API 122 to retrieve data, or perform a specific function. In some embodiments, an API call is an API request which includes a protocol such as a HyperText Transfer Protocol (HTTP) (e.g., GET, POST, PUT, PATCH, etc.), a Uniform Resource Locator (URL) endpoint, request parameters, a header, a combination thereof, and the like.

For example, in an embodiment, a workload (e.g., server hosting the API) deployed as part of the software service is configured to receive the API call "/users/123", which is requesting information about a specific user. In various embodiments, the workload is configured to validate the API call, execute computer instructions for the request, and return an API call response. For example, in an embodiment, the workload is configured to query a database 126, deployed as part of the software service 120, for user information. In an embodiment, the workload is configured to return an API call response for information on a specific user from the resource 128 in JavaScript Object Notation (JSON) format.

In an embodiment, an API call response includes an HTTP status code, a header (e.g., metadata about the API response), a response body, a combination thereof, and the like. In various embodiments, an API call response is structured in a standard format such as JSON, Extensible Markup Language (XML), or plain text.

In some embodiments, the database 126 is configured to store data, a data schema, and the like. In certain embodiments, the database 126 includes a database management system (DBMS). In an embodiment, the database 126 is configured to store data which is exposed through the software service 120, for example, in response to an API request.

In some embodiments, the database 126 is configured to store interactions between the cloud entities of the software service 120, the internet 130, the inspection environment 110, and any combination thereof. In various embodiments, the database 126 is configured to store a log of API calls, API responses, API interactions with other cloud entities, API communication with other entities, and the like.

In various embodiments, the software service 120 includes a storage 124. In an embodiment, the storage 124 is implemented utilizing a physical storage device, a physical storage component, a cloud-based infrastructure, In certain embodiments, the storage 124 is configured to physically store a log of API calls, API responses, API interactions with other cloud entities, API communication with other entities, and the like.

In various embodiments, the storage 124 is implemented as a hard disk drive (HDD), a solid disk drive (SSD), an optical disc, a combination thereof, and the like. In some embodiments, the storage 124 is implemented as a cloud storage (e.g., Amazon® S3, Google® Cloud Storage). In an embodiment, the storage 124 is implemented as a virtual storage device such as a virtual hard disk (VHD), virtual machine disk (VMDK), storage bucket, a combination thereof, and the like.

In various embodiments, an inspection environment 110 is configured to monitor a computing environment in which the software service 120, its cloud entities, and the like are deployed. In an embodiment, the inspection environment 110 is configured to monitor the computing environment for cybersecurity threats, and vulnerabilities. In some embodiments, the inspection environment 110 includes an inspector 114, an active inspector 112, a security database 118, a sensor backend server 116, a combination thereof, and the like.

In various embodiments, the inspector 114 is configured to access an inspectable disk and detect cybersecurity objects thereon. In some embodiments, the inspector 114 is configured to initiate static analysis on the inspectable disk, on code objects stored thereon, on applications stored thereon, etc. In an embodiment, the inspectable disk is generated based on a disk of a resource of the software service 120.

In an embodiment, the inspectable disk includes applications, software code, code objects, software data, software files, binaries, libraries, software images, a combination thereof, and the like. In some embodiments, the inspector 114 is configured to initiate static analysis on the software applications, code objects, software data, software files, and the like, stored on the disk. In an embodiment, the inspector 114 is configured to inspect for a cybersecurity object. A cybersecurity object may be, for example, a password, a certificate, a cryptographic key, a software, an application, a library, a binary, a configuration file, a filesystem, a combination thereof, and the like.

In an embodiment, the workload further includes a disk. In various embodiments, the disk is a storage device, such as a virtual disk, hard disk drive (HDD), a solid-state drive (SSD), and the like. In some embodiments, the disk is configured to store applications, software service data, software application data, software files, software application states, and the like. In various embodiments, the inspectable disk and all of its stored contents are accessible by the inspector 114.

In certain embodiments, the inspection environment 110 further includes an active inspector 112. In an embodiment, the active inspector 112 is configured to initiate active inspection of a cloud entity (e.g., API 122, resource 128, etc.) deployed in the software service 120. In some embodiments, the active inspector 112 is configured to initiate active inspection over a public network, external network, and the like, such as the Internet 130.

In some embodiments, the active inspector 112 is configured to generate a network access instruction. In an embodiment, a network access instruction includes a set of parameters, protocols, rules, and the like, for triggering an API call. In an embodiment, the active inspector 112 is configured to generate a network access instruction which is a request for access to a resource in the cloud computing environment from the API.

In an embodiment, a network access instruction is generated based on a predetermined structure of an API request. For example, in an embodiment, a network access instruction is generated based on parameters of an API call, such as an HTTP protocol, a header, query parameters, an API key, authentication details, payload requests, a combination thereof, and the like. In an embodiment, the active inspector 112 is configured to execute a network access instruction on an API endpoint. In various embodiments, the active inspector 112 is configured to execute a network access instruction on an API endpoint to verify the API endpoint.

In various embodiments, the security database 118 is configured to store a representation of a cloud computing environment, such as a software service 120. In an embodiment, the security database includes a plurality of databases. In certain embodiments, the security database 118 is implemented as a graph database, tabular database, column-oriented database, a combination thereof, and the like. In various embodiments, the security database 118 is configured to store representations of entities, objects, resources, systems, and the like, of a computing environment. In an embodiment, the representation includes an individual representation of an entity, a visual depiction, numerical values, binary values, nodes, edges, a combination thereof, and the like. In some embodiments, an edge indicates a connection, a relationship, etc., between a pair of nodes which the edge connects.

Figure 2:
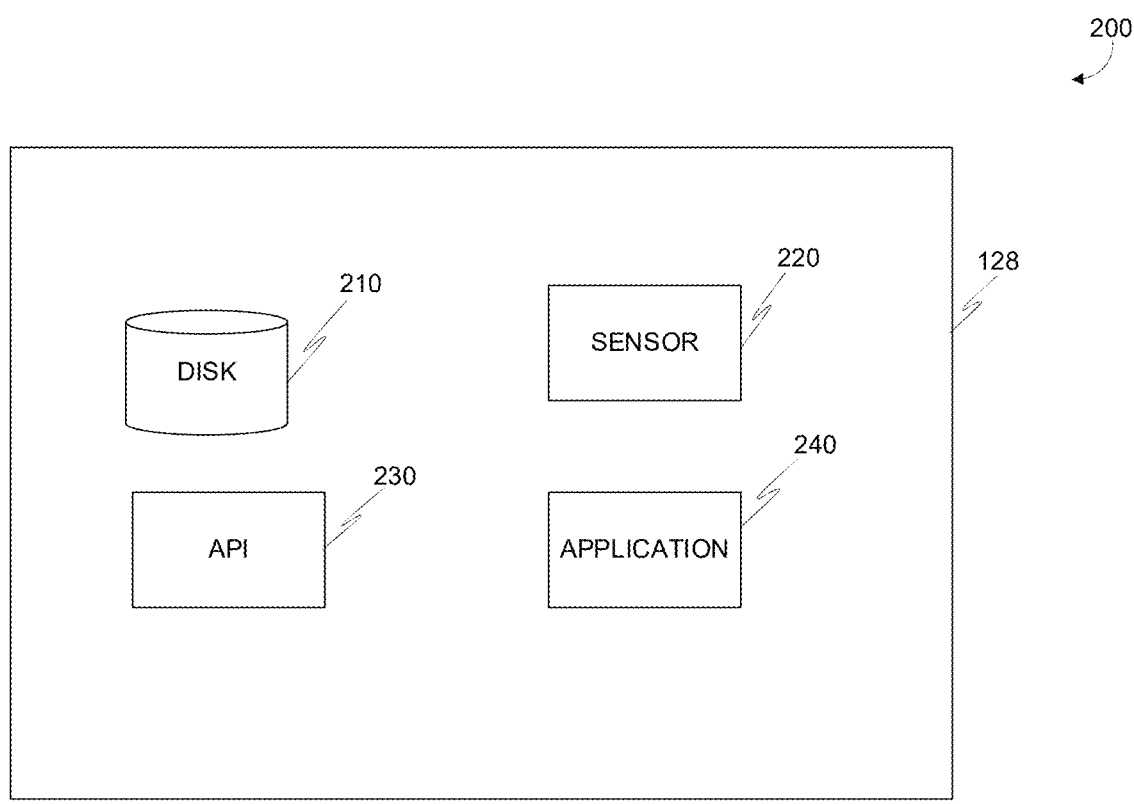
FIG. 2 is an example schematic diagram of an expanded view of resource, implemented in accordance with an embodiment.

In some embodiments, the security database 118 is configured to store interactions between cloud entities and objects of the cloud computing environment. In an embodiment, the security database 118 is configured to store a log of API calls, API responses, API interactions with other entities, API communication with other entities, a combination thereof, and the like. In an embodiment, the security database 118 is configured to store sensor data, runtime data, and the like, generated from a sensor (e.g., sensor 220 of FIG. 2 shown below) deployed on the resource 128. In an embodiment, runtime data includes data of API calls, API call responses, events, runtime events, a combination thereof, and the like.

In some embodiments, the security database 118 is configured to store a representation of the software service 120. In certain embodiments, the security database 118 includes a plurality of databases. In some embodiments, the security database 118 is implemented as a graph database, tabular database, a columnar database, a combination thereof, and the like. In various embodiments, the security database 118 is configured to store representations of entities, objects, resources, systems, and the like, of the software service 120. In an embodiment, the representation includes a visual depiction, numerical values, binary values, nodes, edges, a combination thereof, and the like.

In some embodiments, a sensor is implemented as an Extended Berkeley Packet Filter (eBPF) sensor, a runtime sensor, and the like. In some embodiments, the sensor is implemented as an eBPF sensor which is configured to listen for events of a resource deployed in a computing environment. In some embodiments, the sensor is configured to monitor network interaction, including the interaction between the API 122 and the resource 128, between the API 122 and the Internet 130, etc.

In various embodiments, the sensor is configured to collect data, such as runtime data, and the like, generated from the interactions, communications, and the like between the software service 120, the resource 128, the API 122, a combination thereof, and the like. In an embodiment, for example, the sensor is configured to collect runtime data including data of API calls, API call responses, events, runtime events, a combination thereof, and the like.

In an embodiment, an event is an occurrence, action, and the like, in a computing environment. For example, in an embodiment, an event is a record indicating an access, creating a principal, deploying a resource, an unsuccessful use login attempt, deletion of a file, unusual network communication, system modifications, notifications of security alerts, a combination thereof, and the like.

According to an embodiment, the sensor backend server 116 is a workload, such as a virtual machine, software container, serverless function, a combination thereof, and the like, which is deployed in the inspection environment 110. In certain embodiments, a sensor is further configured to send data (e.g., runtime data), detections, and the like, to the sensor backend server 116. In some embodiments, the sensor is configured to detect events and send a detection notification to the sensor backend server 116. In an embodiment, the detection notification includes an indicator of an event, without including the event itself.

In an embodiment, the sensor backend server 116 is configured to receive runtime data, sensor data, detections, and the like, from the sensor. In an embodiment, the sensor backend server 116 is configured to receive runtime data, including data of API calls, API call responses, events, runtime events, a combination thereof, and the like. In an embodiment, the sensor backend server 116 is configured to receive data (e.g., runtime data) that originates from the software service 120, the API 122, the resource 128, a client, the communication between the resource 128 and the API 122, a combination thereof, and the like.

In certain embodiments, the inspection environment 110 further includes an active inspector 112. In an embodiment, the active inspector 112 is configured to initiate active inspection of a resource, such as workload, in a cloud computing environment. In some embodiments, the active inspector 112 is configured to initiate active inspection over a public network, external network, and the like, such as the Internet 130.

In some embodiments, the active inspector 112 is configured to generate a network access instruction. In an embodiment, a network access instruction includes a set of parameters, protocols, rules, and the like, for triggering an API call. In an embodiment, the active inspector 112 is configured to generate a network access instruction which is a request for access to a resource in the cloud computing environment from the API.

In an embodiment, a network access instruction is generated based on a predetermined structure of an API request. For example, in an embodiment, a network access instruction is generated based on parameters of an API call such as an HTTP protocol, a header, query parameters, an API key, authentication details, payload requests, a combination thereof, and the like. In an embodiment, an active inspector 112 is configured to execute a network access instruction on an API endpoint. In various embodiments, the active inspector 112 is configured to execute a network access instruction on an API endpoint to verify the API endpoint.

In an embodiment, the security database 118 is utilized to detect an exposed API endpoint. In some embodiments, the exposed API endpoint is an API endpoint of the software service 120, which in turn exposes the software service 120. In this regard, it is advantageous to associate representations of entities such as the resource 128, the storage 124, the API 122, the database 126, and the like, with a representation of a software service 120 in the security database 118, as this allows to detect when the software service 120 is exposed.

For example, in an embodiment, where the API 122 is an exposed API endpoint, the entire software service 120 is potentially exposed due to an exposure of a single component thereof. Thus, even if an individual component of the software service 120 is not, in isolation, exposed itself, the fact that the component is connected via the software service 120 to other components in the computing environment, cause the entire software service 120 and the individual component, specifically, to become exposed.

FIG. 2 is an example schematic diagram 200 of an expanded view of the resource 128, implemented in accordance with an embodiment.

In some embodiments, the resource 128 is configured to be deployed in a cloud computing environment. In an embodiment, the resource 128 is configured to be deployed as a component of the software service 120 of FIG. 1 above. In some embodiments, the resource 128 is a virtual machine, a software container, a serverless function, a combination thereof, and the like. In an embodiment, the resource 128 includes a software application, such as a webserver, a gateway, a load balancer, a web application firewall (WAF), an appliance, and the like.

In an embodiment, the resource 128 includes an Application Programming Interface (API) 230, a disk 210, a sensor 220, an application 240 (e.g., software application), a combination thereof, and the like. In an embodiment, the application 240 is a software application, software program, software solution, software platform, code object, a binary, a library, a combination thereof, and the like.

In an embodiment, the sensor 220 is implemented as an Extended Berkeley Packet Filter (eBPF) sensor, a runtime sensor, and the like. In some embodiments, the sensor 220 is implemented as an eBPF sensor which is configured to listen for events of the resource 128, utilizing an eBPF interface. In some embodiments, the sensor 220 is configured to monitor network interaction, including the interaction between the API 230 and another resource, the interaction between the API 230 and other APIs deployed on the software service, an interaction between the API 230 and the cloud computing environment, a combination thereof, and the like.

In various embodiments, the API 230 is configured to communicate with other APIs in a software service, in a computing environment, and the like. In an embodiment, the API 230 is configured to enable communication between a software service and the application 240, the application 240 and other entities, resources, and the like, in the computing environment. In some embodiments, the API 230 is configured to initiate an action on the resource 128 in response to a received API call. In an embodiment, the API 230 is configured to listen on a network port of the resource 128 for an API call.

In various embodiments, the sensor 220 is configured to collect data, such as runtime data, and the like, generated from the interactions, communications, and the like between the API 230, the application 240, a combination thereof, and the like. In an embodiment, for example, the sensor is configured to collect runtime data including data of API calls, API call responses, events, runtime events, a combination thereof, and the like.

In an embodiment, an event is a data record of an access, a request, a communication, a combination thereof, and the like, which occurs as a result of a process (e.g., an application 240) executed on the resource 128.

In some embodiments, the disk 210 is a storage device, such as a virtual disk, hard disk drive (HDD), a solid-state drive (SSD), and the like. In some embodiments, the disk 210 is configured to store the application 240, application data, software service data, a software file, a software application state, a combination thereof, and the like. In an embodiment, the disk 210 is utilized in generating an inspectable disk.

Figure 3:
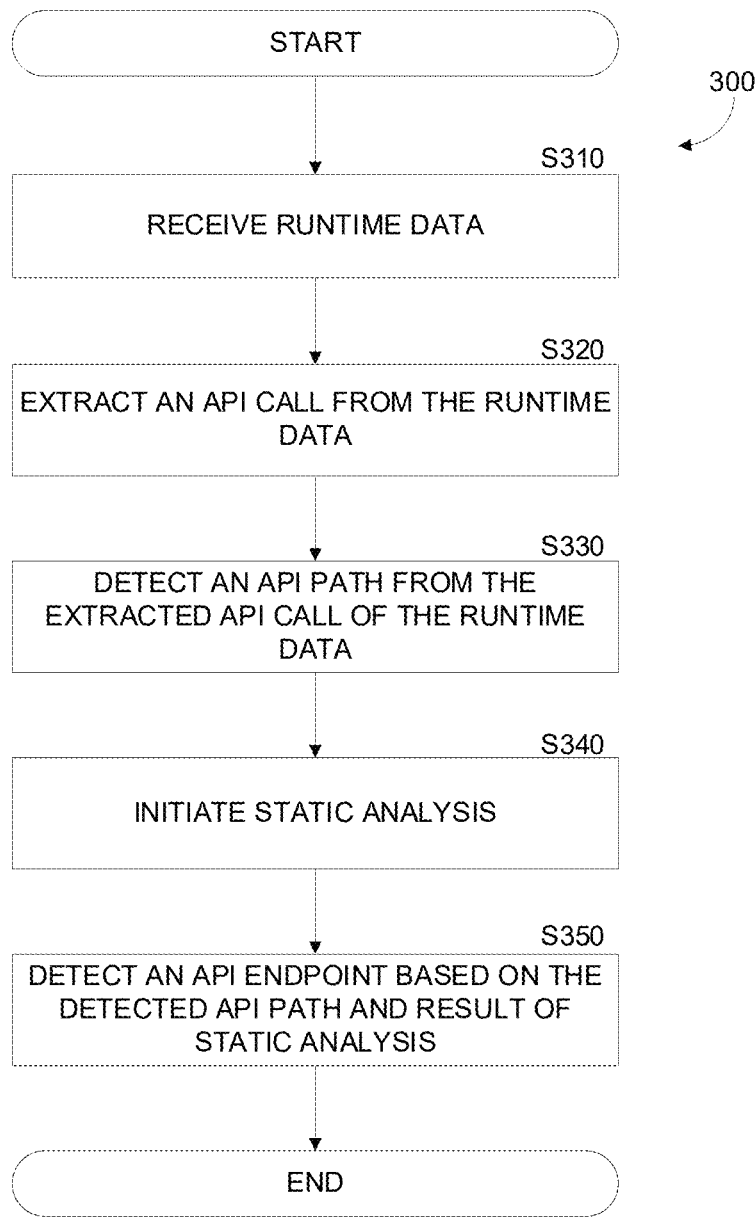
FIG. 3 is an example flowchart of a method for detecting an API endpoint, implemented in accordance with an embodiment.

FIG. 3 is an example flowchart 300 of a method for detecting an API endpoint, implemented in accordance with an embodiment. It is advantageous to detect an API endpoint based on runtime data detected by a sensor and inspection of a workload on which the sensor is deployed, as this provides for a more precise and accurate detection of an actual endpoint. In an embodiment, an API endpoint is a digital location where an API receives API calls for resources of the computing environment. Further, it is advantageous to detect endpoints as they provide valuable insight into potential cybersecurity threats, vulnerabilities, data breaches, and the like.

At S310, runtime data is received. In an embodiment, runtime data is detected by the sensor (e.g., sensor 220). In an embodiment, the sensor is deployed on a resource, workload, and the like, which itself is deployed in a cloud computing environment. In various embodiments, the sensor is implemented as an eBPF sensor, a runtime sensor, and the like. In some embodiments, an eBPF sensor is configured to listen for events in the workload (e.g., resource 128) environment utilizing an eBPF interface.

In some embodiments, the sensor is configured to monitor network traffic, monitor network behavior, track system behaviors of the workload, a combination thereof, and the like. In an embodiment, the sensor is configured to monitor the interaction between an API (e.g., API 122) and the application. In various embodiments, the sensor is configured to detect runtime data generated from monitoring the interactions, communications, and the like, between an application and the API.

In an embodiment, for example, the sensor is configured to collect runtime data including data of API calls, API call responses, events, runtime events, a combination thereof, and the like. According to an embodiment, runtime data is information generated, accessed, or manipulated by a program while it is actively running. In an embodiment, runtime data includes variables, system states, user inputs, logs, temporary data, and other dynamic information needed for a program's operation. Unlike static data, runtime data exists only during the execution period and is typically stored in a memory or other fast-access storage medium, in an embodiment.

In some embodiments, the sensor is configured to merge runtime data into merged runtime execution data records and send such records over a network interface to a sensor backend server. In certain embodiments, the sensor includes detection rules which are applied to events on a workload to detect API calls. According to an embodiment, such runtime events are sent from a sensor and received by a sensor backend server.

At S320, an API call is extracted from the runtime data. In various embodiments, at least an API call is extracted from runtime data based on reading data packets of the runtime data to identify API calls, API data, API responses, a combination thereof, and the like. In some embodiments, API call data includes data of parameters such as an API path, an HTTP method (e.g., GET, POST, PUT, PATCH, etc.), a Uniform Resource Locator (URL) endpoint, a request header, a request body, a combination thereof, and the like.

In some embodiments, API call data is extracted from the runtime data. In an embodiment, an API endpoint is a dedicated URL that provides access to a specific resource, location, and the like, in the cloud computing environment. For example, in an embodiment, an API endpoint includes "https://api.example.com/user/321".

In an embodiment, an API path is a portion of an API endpoint that defines the resource, action, command, and the like, being requested from the server. For example, in an embodiment, an API path includes "user/321", which refers to a specific user identifier.

In an embodiment, a request type includes a Hypertext Transfer Protocol (HTTP) method which is a command (e.g., GET, POST, PUT, DELETE, etc.) used to indicate the desired operation of a resource for the API. For example, in an embodiment, a request type of "GET myData" indicates the API request of retrieving specific data from a particular resource in the cloud computing environment.

In various embodiments, a request header of an API request contains metadata in the format of key-value pairs. For example, in an embodiment, a request header includes "Content-Type: application/json" which indicates that the request body of the API call contains an application in standardized JSON format. In some embodiments, a request body of an API request includes the portion of the API request carrying essential data required for the completion of the API request. For example, in an embodiment, for an API request of creating a new user account, the request body includes data such as a user identifier, a user email address, a user name, a password, a combination thereof, and the like.

At S330, an API path is detected. In an embodiment, the API path is detected from the extracted API call of the runtime data. In an embodiment, an API path is a portion of the API call that defines the resource or action being requested from the server. In various embodiments, extracted API calls are identified and parsed to detect distinct parameters of the API call. In some embodiments, inspection of a workload associated with the detected API path is initiated.

In an embodiment, an API path, an API endpoint, an API request type, and the like, is detected from an API call. For example, in an embodiment, an API path of "/applications.name/" indicating a call request for accessing a specific application, is detected from an API call. In an embodiment, for example, an API path of "users/24", indicating a call request of providing access for a user identifier, is detected from an API call.

At S340 static analysis is initiated. According to an embodiment, an application identifier is detected in runtime data, in an API call, and the like. In some embodiments, inspection, static analysis, etc., is initiated on a workload on which the sensor is deployed to detect the application related to the API call. For example, an API call, an API call type, a regex of an API, etc., may be pre-associated with certain software applications, binaries, libraries, and the like, and inspection is initiated for such software applications that correspond to identifiers, indicators, etc., which are detected in the API call.

In various embodiments, an application (e.g., application 240) is a load balancer, a proxy server, a webserver, a software application, a code object, a combination thereof, and the like. In some embodiments, the application is configured to generate an API call. In various embodiments, static analysis is initiated on the application to determine the configuration, functionalities, a combination thereof, and the like, of the application.

In some embodiments, static analysis is conducted by analyzing the code, software code, functions, calls, variables, and the like, of the application without fully executing it. In various embodiments, static analysis is conducted on the application to inspect software code that constructs an API call. In some embodiments, static analysis is conducted on the application, code, code objects, and the like, to obtain data from an API call including the API endpoint, API path, request type, request header, request body, a combination thereof, and the like.

In an embodiment, static analysis is initiated on a code object which is utilized to deploy an application. For example, static analysis may be initiated on a software package installer, on the software thereon, and the like, to detect various applications, detect configuration of such applications, and the like.

At S350, an API endpoint is detected. In some embodiments, an endpoint is detected based on the detected API path and the result of static analysis. In an embodiment, an API path is detected from an extracted API call from runtime data. In some embodiments, the detected API path is associated with the results of static analysis to detect a specific API endpoint.

According to an embodiment, a network path is detected between the workload and an external network. In an embodiment, the external network is a network which is not part of the computing environment in which the workload is deployed. In an embodiment, the network path includes a URL. In some embodiments, the network path includes a list of identifiers of resources, such as a gateway, a load balancer, a web server, and the like, which are part of a network path between the external network and the workload.

In certain embodiments, the network path is detected based on analysis of a security database which includes a representation of the computing environment. In an embodiment, resources are represented in the security database and a path between the resources is detected by traversing a graph which is stored in the security database, wherein the graph includes representations of the resources and of connections between the resources.

In an embodiment, static analysis is conducted on an application to obtain API call data including an API path, a request type (e.g., GET, POST, PUT, PATCH, etc.), a Uniform Resource Locator (URL) endpoint, a request header, a request body, a combination thereof, and the like, of the API call.

In an embodiment, the API path extracted from runtime data is compared to the API call data generated from static analysis to detect an endpoint associated with the API path. In various embodiments, the detected endpoints are collected, compiled (e.g., compiled into a list), and stored in a disk, database, security database, a combination thereof, and the like.

In an embodiment, an API endpoint includes a resource locator and an API call. In certain embodiments, a plurality of API endpoints are detected for a particular resource. For example, in some embodiments, a plurality of API calls are detected in runtime data of a resource, each corresponding to a unique API endpoint. In certain embodiments, where an application is detected, additional API endpoints are generated based on at least one API call which is predetermined to be associated with the application. This may be performed despite not detecting the at least an API call in the runtime data.

Figure 4:
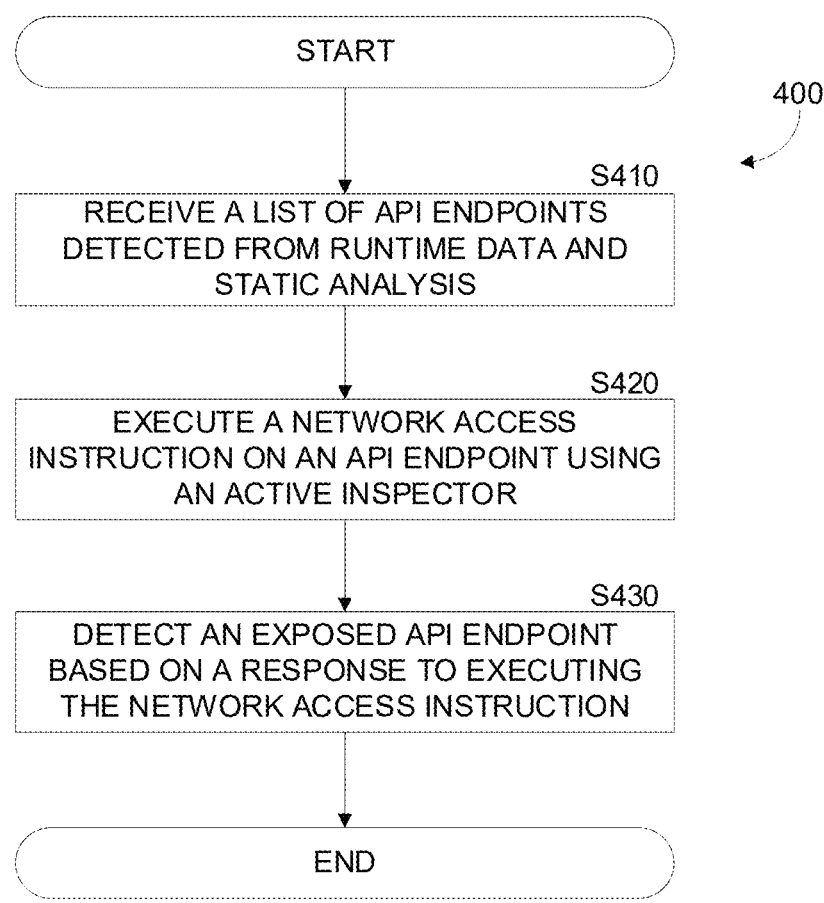
FIG. 4 is an example flowchart of a method for API endpoint verification, implemented in accordance with an embodiment.

FIG. 4 is an example flowchart 400 of a method for API endpoint verification, implemented in accordance with an embodiment. It is advantageous to utilize a network access instruction response to detect an exposed API endpoint as this provides an accurate and efficient determination of whether an API endpoint is exposed. Further, it is advantageous to detect an exposed API endpoint as this allows for the detection of potential cybersecurity threats, data breaches, vulnerabilities, a combination thereof, and the like. An exposed API endpoint is an endpoint which, according to an embodiment, allows unintended access to the application behind the API endpoint.

At S410, a list of detected API endpoints is received. In an embodiment, the list of detected API endpoints is generated based on runtime data and static analysis results of an application. In various embodiments, detecting API endpoints includes extracting API calls from runtime data detected by a sensor, runtime sensor, and the like. In an embodiment, an API path is detected from an API call of the runtime data.

In some embodiments, the detected API path is associated with an application detected from static analysis results in order to detect an API endpoint. In certain embodiments, the detected API path is compared to application configurations, API call data of an application, application functionalities, a combination thereof, and the like, to correspond the API path with an application in order to detect an API endpoint.

In various embodiments, the detected endpoints are stored in a disk, database, security database, a combination thereof, and the like. In an embodiment, the detected endpoints are collected, compiled (e.g., compiled into a list), and stored in a database, security database, disk, a combination thereof, and the like. In an embodiment, the stored API endpoints (e.g., compilation, list, group, etc.) are extracted from the disk, database, security database, a combination thereof, and the like.

At S420, a network access instruction is executed on an API endpoint. In an embodiment, an active inspector is configured to generate a network access instruction. In an embodiment, a network access instruction includes a set of parameters, protocols, rules, and the like, for triggering an API call. In various embodiments, the active inspector is configured to generate the network access instruction based on data extracted from an API call. In an embodiment, the active inspector is configured to generate a network access instruction based on network configurations, including Internet Protocol (IP) addresses, Domain Name System (DNS) settings, Virtual Private Network (VPN) configurations, a combination thereof, and the like.

In an embodiment, a network access instruction is generated based on a predetermined structure of an API request. For example, in an embodiment, a network access instruction includes an HTTP protocol, a header, query parameters, an API key, authentication details, payload requests, a combination thereof, and the like. For example, in an embodiment, a network access instruction includes an HTTP method such as "GET", "POST", "PUT", "DELETE", and the like. In an embodiment, for example, a network access instruction includes a header such as "Content-Type: application/json", which indicates that the content of the request is an application in a JSON format.

In an embodiment, an active inspector is configured to execute a network access instruction on an API endpoint. In various embodiments, a network access instruction is executed on an API endpoint to verify the API endpoint. In some embodiments, a network access instruction is executed on a network path, including at least an external network. In an embodiment, an external network is external to the cloud computing environment.

In an embodiment, for example, a network access instruction is executed in a request for access to a resource in the cloud computing environment from the API. In an embodiment, a server is configured to process the network access instruction and generate a network access instruction response. For example, in an embodiment, a network access instruction response to a network instruction for accessing a specific resource is "HTTP Forbidden: Access denied", which indicates that the user does not have permission to access the network.

At S430, an exposed API endpoint is detected. In an embodiment, an exposed API endpoint is detected based on a response of the executed network access instruction. In various embodiments, an exposed API endpoint is a specific location within the API that is exposed to unauthorized parties, unauthorized users, external environments, external applications, external resources, public environments, a combination thereof, and the like.

In an embodiment, an exposed API endpoint is a cybersecurity threat, having the potential to be exploited and reveal private data, more data than necessary, etc., to unauthorized parties, external environments, external applications, public environments, a combination thereof, and the like. In some embodiments, exposed API endpoints lead to potential security vulnerabilities, cybersecurity threats, data breaches, a combination thereof, and the like.

In an embodiment, an API endpoint is determined to be exposed in response to receiving a predetermined result from execution of the network access instruction.

In various embodiments, a network access instruction response that indicates an API endpoint is exposed includes a response that returns endpoint data without requiring any sort of authentication. For example, in an embodiment, a network access instruction response of "user_identifier: user234", which provides detailed user information without requiring any authentication, indicates an exposed endpoint. In an embodiment, a network access instruction response that indicates an exposed API endpoint includes a response that shares sensitive network information.

For example, in an embodiment, a network access instruction response of "hostname:serverABC" and "ip_address: 124.33.1.1" indicates an exposed API endpoint as it shares internal network data without asking for any authorization or credentials prior to sharing.

Figure 5:
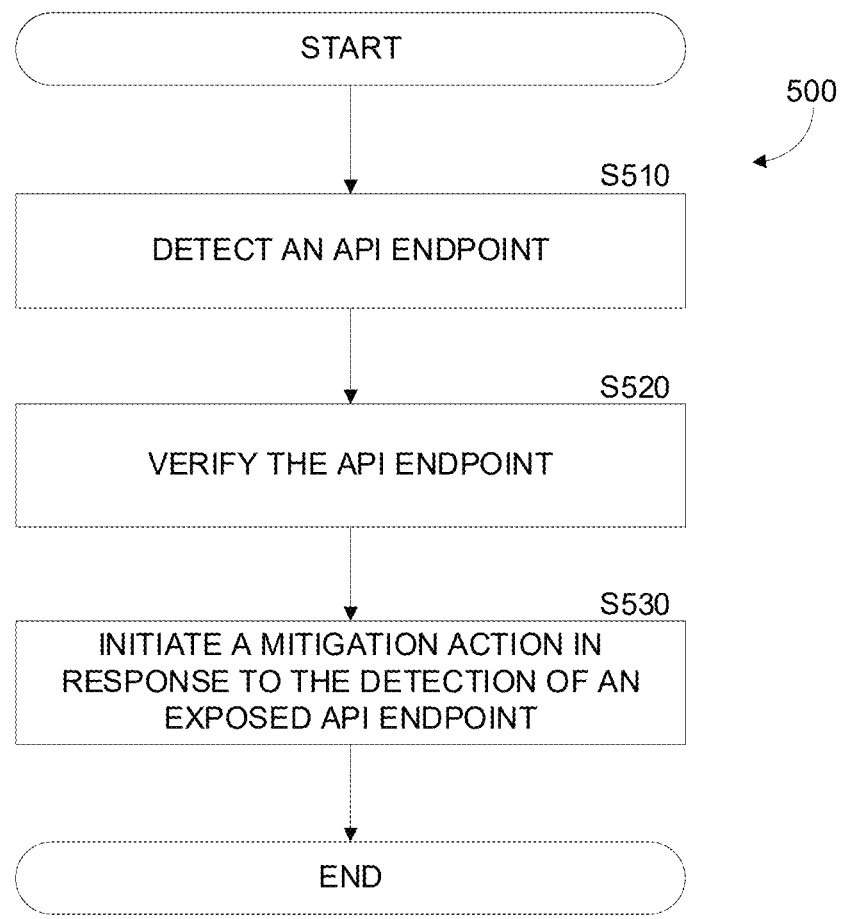
FIG. 5 is an example flowchart of a method for initiating a mitigation action in response to the detection of an exposed API endpoint, implemented in accordance with an embodiment.

FIG. 5 is an example flowchart 500 of a method for initiating a mitigation action in response to the detection of an exposed API endpoint, implemented in accordance with an embodiment. It is advantageous to execute mitigation actions on exposed API endpoints after they have been determined to be exposed based on verification techniques, as this allows for the effective and accurate detection of potential cybersecurity threats, vulnerabilities, data breaches, and the like. Further, it is advantageous, according to an embodiment, to execute mitigation actions on API endpoints that are determined to be exposed as this allows for effective resource allocation for the mitigation of potential threats, vulnerabilities, data breaches, and the like.

At S510, an API endpoint is detected. In an embodiment, an API endpoint is a digital location (e.g., a URL), that enables applications to interact with resources, workloads, components, and the like, of the cloud computing environment. In various embodiments, detecting an API endpoint includes extracting at least an API call from runtime data detected by a sensor, runtime sensor, and the like.

In an embodiment, the sensor is deployed on a resource, workload, and the like, in the cloud computing environment. In certain embodiments, the sensor is configured to detect runtime data from monitoring the interactions, communications, and the like, between the application and the API. In some embodiments, the sensor is configured to detect runtime data including data of API calls, API call responses, events, runtime events, a combination thereof, and the like.

In an embodiment, at least an API call is extracted from runtime data. In various embodiments, API calls are extracted based on reading data packets of the runtime data to identify API calls, API data, API responses, a combination thereof, and the like. In some embodiments, an API path is detected from the extracted API call, API call data, a combination thereof, and the like, of the runtime data.

In some embodiments, the detected API path is associated with an application detected from static analysis results in order to detect an API endpoint. In certain embodiments, the detected API path is compared to application configurations, API call data of an application, application functionalities, a combination thereof, and the like, to associate the API path with an application in order to detect an API endpoint. In an embodiment, an API path is detected based on inspection of a code object, a software image, etc.

At S520, an API endpoint is verified. In some embodiments, an API endpoint is verified in order to detect an exposed API endpoint. In an embodiment, an exposed API endpoint is an endpoint which allows unintended access to the application behind the API endpoint. In an embodiment, an exposed API endpoint is a cybersecurity threat, having the potential to be exploited and reveal private data, more than necessary data, etc., to unauthorized parties, external environments, external applications, public environments, a combination thereof, and the like.

In various embodiments, an exposed API endpoint is detected based on a result of executing a generated network access instruction on an API endpoint. In certain embodiments, a network access instruction includes a set of parameters, protocols, rules, and the like, for triggering an API call. In an embodiment, a network access instruction is a request for access to a resource in the cloud computing environment from the API. According to an embodiment, a network access instruction is executed over a network path including an external network, wherein the external network is external to the computing environment of the API endpoint (e.g., the cloud computing environment). In some embodiments, the external network is not part of the cloud computing environment.

In some embodiments, a list of the detected API endpoints is generated based on runtime data and static analysis results of an application. In an embodiment, the list of generated API endpoints is received.

In various embodiments, an active inspector is configured to generate a network access instruction based on data extracted from an API call. In an embodiment, the active inspector is configured to generate a network access instruction based on a predetermined structure of an API request. In an embodiment, the active inspector is configured to generate a network access instruction based on network configurations, including Internet Protocol (IP) addresses, Domain Name System (DNS) settings, Virtual Private Network (VPN) configurations, a combination thereof, and the like.

In various embodiments, an active inspector is configured to execute a network access instruction on a detected API endpoint, of the generated API list, in order to verify the API endpoint. In some embodiments, a server is configured to process the network access instruction and generate a network access instruction response.

In various embodiments, an API endpoint is determined to be exposed based on a network access instruction response. For example, in an embodiment, a network access instruction response that indicates that an API endpoint is exposed includes a response that returns endpoint data without requiring any sort of authentication. In certain embodiments, an API endpoint is determined to be exposed in response to receiving a predetermined result from execution of the network access instruction. In an embodiment, an API endpoint is determined to be exposed in response to receiving a result that is not a predetermined result (i.e., any result other than the predetermined result) from execution of the network access instruction.

In an embodiment, an API endpoint is determined to be unexposed (i.e., not exposed), in response to receiving a result which is not a predetermined result, receiving a result which is a predetermined result, etc.

At S530, a mitigation action is initiated. In an embodiment, the mitigation action is initiated in response to the detection of an exposed API endpoint. In some embodiments, a mitigation action includes implementing input validations, authentication protocols, API rate limiting and throttling, an API gateway, a combination thereof, and the like. In an embodiment, the mitigation action of implementing an input validation for an API includes configuring a resource hosting the application, for example, to implement a schema, specifying the type, format, range of acceptable values, a combination thereof, and the like, for each API endpoint, and further configuring the resource to reject any API input that does not conform to this defined schema.

In certain embodiments, a mitigation action includes the implementation of authentication protocols which allow only authorized users to access the API. Some examples of authentication protocols, in an embodiment, include the implementation of passwords, tokens, biometric data, a combination thereof, and the like to authenticate user identity. In an embodiment, a mitigation action includes the implementation of API rate limiting which limits the amount of requests that a user, application, client, and the like, can make to the API within a predefined time period.

In various embodiments, a mitigation action includes the implementation of an API gateway which monitors the flow of API calls, API requests, API data, a combination thereof, and the like, to detect unusual patterns a potential threat, data breach, and the like. In an embodiment, a mitigation action includes generating an alert, generating a notification, revoking access from a principal, revoking access from a resource, a combination thereof, and the like.

In some embodiments, a plurality of mitigation actions are generated, each corresponding to a different platform of the cloud computing environment. For example, in an embodiment, a cybersecurity threat related to an exposed API endpoint can be mitigated in the control plane of the computing environment, in the data plane of the computing environment, by initiating an action in the infrastructure of the environment utilizing infrastructure as a service (IaaS), by initiating an action in the platform of the environment utilizing a platform as a service (PaaS), by initiating an action in the software layer of the environment utilizing software as a service (SaaS), replacing a code object, patching a misconfiguration, revoking access to a resource, revoking access from a resource, a combination thereof, and the like.

Figure 6:
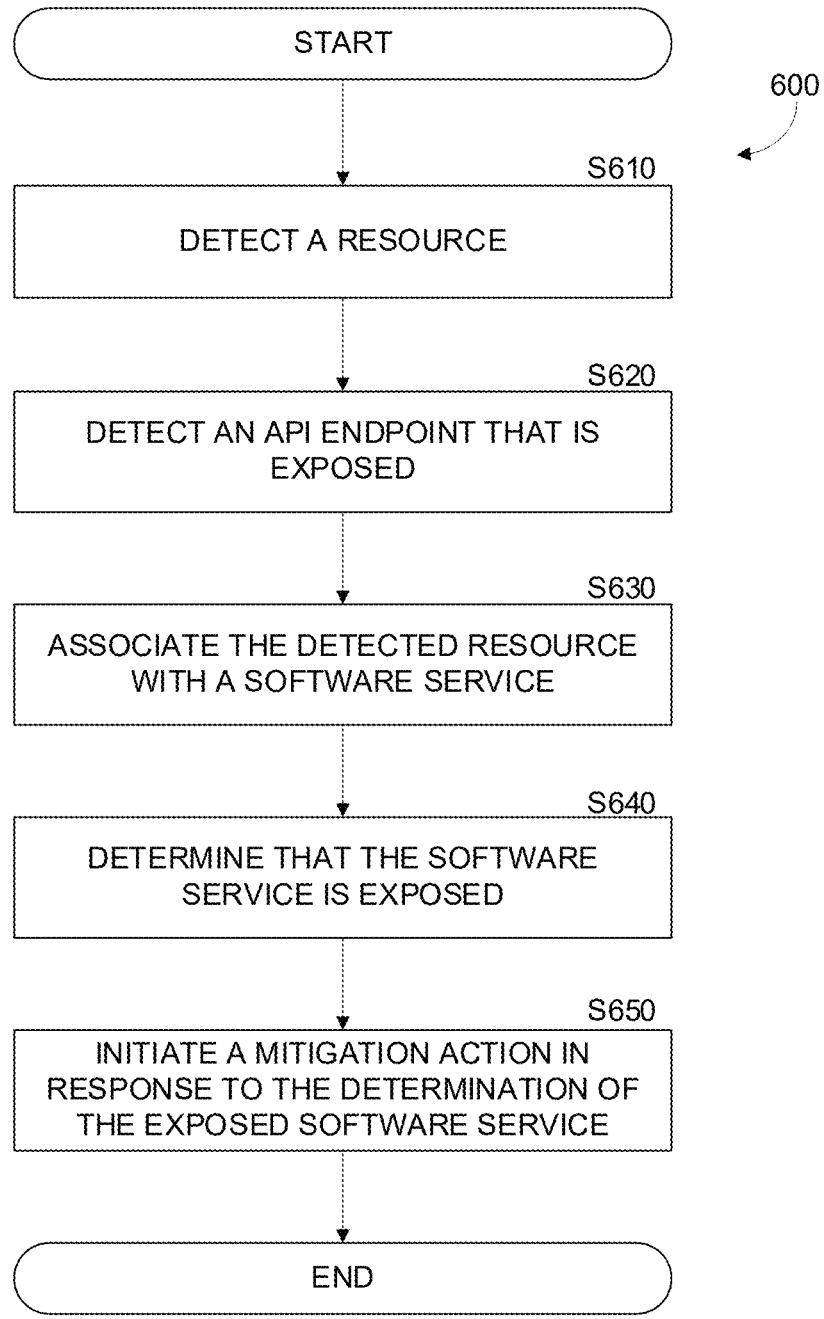
FIG. 6 is an example flowchart of a method for initiating a mitigation action in response to the determination of an exposed service, implemented in accordance with an embodiment.

FIG. 6 is an example flowchart 600 of a method for initiating a mitigation action in response to detecting a software service exposed through an API endpoint, implemented in accordance with an embodiment. It is advantageous to detect an exposed software service and rapidly initiate a mitigation action on the exposed software service as such exposures are a prime targets for cybersecurity attacks, exploitation, and vulnerabilities.

At S610, a resource is detected. In an embodiment, a resource is detected in a computing environment by initiating network discovery, querying an API of the computing environment, querying an orchestrator of a cloud computing environment, a combination thereof, and the like. In some embodiments, a resource is a virtual machine, a software container, a serverless function, a combination thereof, and the like. In an embodiment, the resource is a software application, such as a webserver, a gateway, a load balancer, a web application firewall (WAF), an appliance, and the like.

In an embodiment, a plurality of resources are detected in the computing environment. In some embodiments, a resource deployed in a cloud computing environment is referred to as a cloud entity. In various embodiments, certain cloud entities are configured to be deployed on the resource in the cloud computing environment, for example as nested workloads. In various embodiments, a sensor is configured to be deployed on resources.

In some embodiments, a sensor is implemented as an Extended Berkeley Packet Filter (eBPF) sensor, a runtime sensor, and the like. In some embodiments, the sensor is implemented as an eBPF sensor which is configured to listen for events in the cloud computing environment, utilizing an eBPF interface. In some embodiments, the sensor is configured to monitor network interaction, including the interaction between an API and the resource.

In various embodiments, the sensor is configured to collect data, such as runtime data, and the like, generated from the interactions, communications, and the like between the software service, the resource, the API, a combination thereof, and the like. In an embodiment, for example, the sensor is configured to collect runtime data including data of API calls, API call responses, events, runtime events, a combination thereof, and the like.

In an embodiment, a database, a security database, and the like, is configured to store sensor data, runtime data, and the like, generated from a sensor. In an embodiment, runtime data includes data of API calls, API call responses, events, runtime events, a combination thereof, and the like.

In certain embodiments, runtime data, runtime event logs, event logs, and events are extracted and filtered to detect specific resources deployed in the software service, cloud computing environment, virtual machine, and the like. For example, in an embodiment, a runtime event of the provisioning of a resource (e.g., virtual machine) to deploy a software application is extracted and the data indicating that the resource is a virtual machine is detected.

At S620, an exposed API endpoint is detected. In various embodiments, detecting API endpoints includes extracting API calls from runtime data detected by a sensor, runtime sensor, and the like. In an embodiment, an API path is detected from an API call of the runtime data.

In some embodiments, the detected API path is associated with an application detected from static analysis results in order to detect an API endpoint. In certain embodiments, the detected API path is compared to application configurations, API call data of an application, application functionalities, a combination thereof, and the like, to correlate the API path with a software application in order to detect an API endpoint.

In various embodiments, the detected API endpoints are stored on a disk, database, security database, a combination thereof, and the like. In an embodiment, the detected API endpoints are collected, compiled (e.g., compiled into a list), and stored in a database, security database, disk, a combination thereof, and the like. In an embodiment, the stored API endpoints (e.g., compilation, list, group, etc.) are queried from the database, security database, etc.

In some embodiments, a network access instruction is executed on an API endpoint. In an embodiment, an active inspector is configured to generate a network access instruction. In an embodiment, a network access instruction includes a set of parameters, protocols, rules, and the like, for triggering an API call. In various embodiments, the active inspector is configured to generate the network access instruction based on data extracted from an API call. In an embodiment, the active inspector is configured to generate a network access instruction based on network configurations, including Internet Protocol (IP) addresses, Domain Name System (DNS) settings, Virtual Private Network (VPN) configurations, a combination thereof, and the like.

In an embodiment, a network access instruction is generated based on a predetermined structure of an API request. For example, in an embodiment, a network access instruction includes an HTTP protocol, a header, query parameters, an API key, authentication details, payload requests, a combination thereof, and the like.

In an embodiment, an active inspector is configured to execute a network access instruction on an API endpoint. In various embodiments, a network access instruction is executed on an API endpoint to validate the API endpoint. In some embodiments, a network access instruction is executed on a network path, including at least an external network. In an embodiment, an external network is external to the cloud computing environment.

In an embodiment, for example, a network access instruction is executed in a request for access to a resource in the cloud computing environment from the API. In an embodiment, a server is configured to process the network access instruction and generate a network access instruction response. For example, in an embodiment, a network access instruction response to a network instruction for accessing a specific resource is "HTTP Forbidden: Access denied", which indicates that the user does not have permission to access the resource.

In an embodiment, an exposed API endpoint is detected based on a response of the executed network access instruction. In various embodiments, an exposed API endpoint is a specific location within the API that is exposed to unauthorized parties, unauthorized users, external environments, external applications, external resources, public environments, a combination thereof, and the like.

In an embodiment, an exposed API endpoint is a cybersecurity threat, having the potential to be exploited and reveal private data, more data than necessary, etc., to unauthorized parties, external environments, external applications, public environments, a combination thereof, and the like. In some embodiments, exposed API endpoints lead to potential security vulnerabilities, cybersecurity threats, data breaches, a combination thereof, and the like.

In an embodiment, an API endpoint is determined to be exposed in response to receiving a predetermined result, receiving a result other than a predetermined result, etc., from execution of the network access instruction. In various embodiments, a network access instruction response that indicates an API endpoint is exposed includes a response that returns endpoint data without requiring any sort of authentication.

At S630, the detected resource is associated with a software service. In an embodiment, runtime data, runtime event logs, event logs, events, are filtered to detect resources, components, entities, and the like, of a software service. In an embodiment, an event log includes a plurality of data records, each data record corresponding to an event that occurred in the computing environment. In an embodiment, a runtime event log is a data record of an event that occurred on a resource, based on runtime data generated from a runtime sensor. In some embodiments, a software service is associated with the detected resource it is deployed on. For example, in an embodiment, a software application that is deployed on the resource of a virtual machine is associated with that specific virtual machine.

In some embodiments, detected resources are associated with other resources they interact with, communicate with, and the like. For example, in an embodiment, a network resource such a load balancer is configured to distribute incoming traffic to various instances of a plurality of web servers. The load balancer and plurality of web servers are all detected resources, and communication therebetween is detected through runtime execution data, network logs, cloud logs, a combination thereof, and the like. In an embodiment, such resources are associated together as a software service. In an embodiment, the software service is represented in a security database, and a representation of the software service is connected to a plurality of representations, each representation corresponding to a resource, a principal, and the like which communicate, or otherwise access, at least each other.

At S640, the software service is determined to be exposed. In an embodiment, an exposed software service is a software service that is made accessible over the internet, a public network, an external network, and the like, which exposes the software service to potential security risks and threats. In various embodiments, an exposed API endpoint is an indication that a particular resource is accessible from an external network. In an embodiment, where there is an indication that a particular resource is accessible then the associated software service of that particular resource is determined to be exposed.

In an embodiment, a security database is configured to store a representation of exposed API endpoints, API calls, API responses, API interactions with other entities, API communication with other entities, API interactions with resources, and the like. In an embodiment, the security database is configured to store sensor data, runtime data, and the like, generated from a sensor deployed on a resource. In an embodiment, runtime data includes data of API calls, API call responses, events, runtime events, software service data, resource data, a combination thereof, and the like.

In an embodiment, the security database is queried to determine whether a particular software service is exposed. In certain embodiments, the security database is queried for an exposed API endpoint. In some embodiments, the security database is queried for resources that are identified, provided access controls, etc., by a particular API endpoint. In an embodiment, the security database is queried to detect a resource associated with an exposed API endpoint.

In an embodiment, a security graph is traversed to detect a representation of a software service (e.g., a software service node) that is connected to a representation of a resource (e.g., a resource node) which in turn is connected to a representation of an API endpoint (e.g., API endpoint node) that is determined to be an exposed API endpoint. In some embodiments, an exposed API endpoint is indicated as such in the security database utilizing a data field value, a tag, an insight, and the like, to indicate that the API endpoint is an exposed API endpoint. In such embodiments, a software service is determined to be exposed where the software service includes a component, a resource, an entity, and the like, which has an exposed API endpoint.

At S650, a mitigation action is initiated. In some embodiments, a mitigation action is initiated in response to detecting an exposed software service. In some embodiments, a mitigation action includes deploying a firewall rule, initiating installation of software patches, updates, and the like, implementing authentication protocols, restricting access to the exposed software service, a combination thereof, and the like.

For example, in an embodiment a software patch is installed on an exposed software service by detecting a software patch for the source code, code objects, software program, and the like, of the exposed software service, and modifying portions of the source code to remove any outdated code lines, replace outdated code lines, etc.

In some embodiments, a mitigation action includes generating a notification, generating an alert, generating a risk score, generating a severity score, generating a ticket in an issue tracking system, revoking access to a resource, revoking access from a principal, a combination thereof, and the like.

Figure 7:
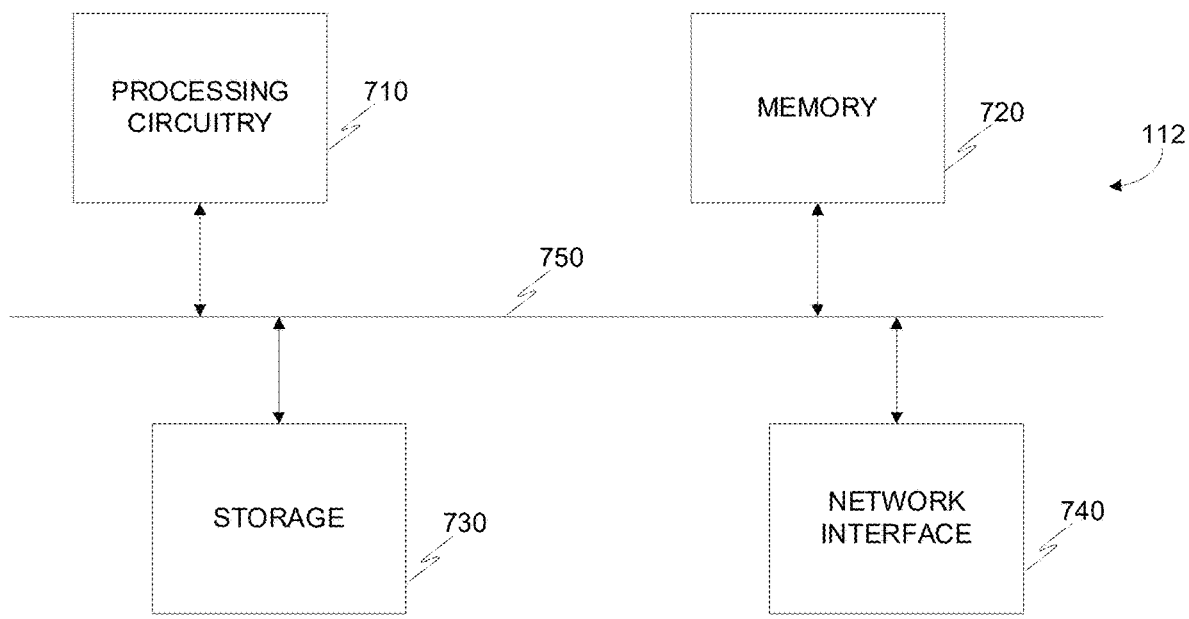
FIG. 7 is an example schematic diagram of an active inspector, implemented in accordance with an embodiment.

FIG. 7 is an example schematic diagram of an active inspector 112, according to an embodiment. The active inspector includes a processing circuitry 710 coupled to a memory 720, a storage 730, and a network interface 740. In an embodiment, the components of the active inspector 112 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read-only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the active inspector 112 to communicate with, for example, an internet 130, an API 122, an inspector 114, a sensor backend server 116, and the like.

It should be understood that the embodiments described herein are not limited to the specific architecture illustrated in FIG. 7, and other architectures may be equally used without departing from the scope of the disclosed embodiments.

Furthermore, in certain embodiments, the active inspector 112, an inspector 114, and the like, may be implemented with the architecture illustrated in FIG. 7. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces.

The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting an exposed software service in a cloud computing environment, comprising:
    detecting a plurality of resources in the cloud computing environment, wherein each resource is deployed in the cloud computing environment;
    associating each resource of the plurality of resources with a software service; detecting a plurality of Application Programming Interface (API) endpoints, each API endpoint associated with at least a resource of the plurality of resources;
    detecting an exposed API endpoint from the plurality of API endpoints based on executing a network access instruction on an API endpoint, and further in response to receiving a predetermined result of executing the network access instruction;
    determining that the software service is exposed in response to determining that a resource associated with the exposed API endpoint is associated with the software service; and
    initiating a mitigation action in response to determining that the software service is exposed.

2. The method of claim 1, further comprising:
    generating a representation of the cloud computing environment in a security database, the representation including: a representation of each resource, a representation of each API endpoint, and a representation of the software service.

3. The method of claim 2, wherein determining that the software service is exposed further comprises:

querying the security database to detect a representation of an API endpoint connected to a representation of a resource, wherein the representation of the resource is connected to a representation of a software service.

4. The method of claim 3, wherein the representation of the API endpoint indicates that the API endpoint is an exposed API endpoint.

5. The method of claim 1, wherein associating each resource with a software service further comprises:
   detecting an event including an identifier of a first resource and an identifier of a second resource; and
   associating the first resource and the second resource with the software service in response to determining that the event is of a predetermined type.

6. The method of claim 1, further comprising:
   determining that the exposed API endpoint is remediated by the mitigation action; and
   determining that the exposed software service is not exposed in response to detecting the remediation.

7. The method of claim 1, further comprising:
   initiating inspection of each resource of the plurality of resources; and
   detecting at least a portion of the plurality of API endpoints based on a result of the initiated inspection.

8. The method of claim 7, wherein inspection includes:
   generating an inspectable disk; and
   initiating static analysis on the inspectable disk to detect an API endpoint.

9. The method of claim 7, further comprising:
   detecting at least another portion of the API endpoints from runtime events, each runtime event detected by a sensor configured to detect runtime events on a resource.

10. A non-transitory computer-readable medium storing a set of instructions for detecting an exposed software service in a cloud computing environment, the set of instructions comprising:
    one or more instructions that, when executed by one or more processing circuitries of a device, cause the device to:
       detect a plurality of resources in the cloud computing environment, wherein each resource is deployed in the cloud computing environment;
       associate each resource of the plurality of resources with a software service;
       detect a plurality of Application Programming Interface (API) endpoints, each API endpoint associated with at least a resource of the plurality of resources;
       detect an exposed API endpoint from the plurality of API endpoints based on executing a network access instruction on an API endpoint, and further in response to receiving a predetermined result of executing the network access instruction;
       determine that the software service is exposed in response to determining that a resource associated with the exposed API endpoint is associated with the software service; and
       initiate a mitigation action in response to determining that the software service is exposed.

11. A system for detecting an exposed software service in a cloud computing environment comprising:
    a processing circuitry;
    a memory, the memory containing instructions that, when executed by the processing circuitry, configure the system to:
       detect a plurality of resources in the cloud computing environment, wherein each resource is deployed in the cloud computing environment;
       associate each resource of the plurality of resources with a software service;
       detect a plurality of Application Programming Interface (API) endpoints, each API endpoint associated with at least a resource of the plurality of resources;
       detect an exposed API endpoint from the plurality of API endpoints based on executing a network access instruction on an API endpoint, and further in response to receiving a predetermined result of executing the network access instruction;
       determine that the software service is exposed in response to determining that a resource associated with the exposed API endpoint is associated with the software service; and
       initiate a mitigation action in response to determining that the software service is exposed.

12. The system of claim 11, wherein the memory contains further instructions which when executed by the processing circuitry further configure the system to:
    generate a representation of the cloud computing environment in a security database, the representation including:
    a representation of each resource, a representation of each API endpoint, and a representation of the software service.

13. The system of claim 12, wherein the memory contains further instructions that, when executed by the processing circuitry for determining that the software service is exposed, further configure the system to:
    query the security database to detect a representation of an API endpoint connected to a representation of a resource, wherein the representation of the resource is connected to a representation of a software service.

14. The system of claim 13, wherein the representation of the API endpoint indicates that the API endpoint is an exposed API endpoint.

15. The system of claim 11, wherein the memory contains further instructions that, when executed by the processing circuitry for associating each resource with a software service, further configure the system to:
    detect an event including an identifier of a first resource and an identifier of a second resource; and
    associate the first resource and the second resource with the software service in response to determining that the event is of a predetermined type.

16. The system of claim 11, wherein the memory contains further instructions which when executed by the processing circuitry further configure the system to:
    determine that the exposed API endpoint is remediated by the mitigation action; and
    determine that the exposed software service is not exposed in response to detecting the remediation.

17. The system of claim 11, wherein the memory contains further instructions which when executed by the processing circuitry further configure the system to:
    initiate inspection of each resource of the plurality of resources; and
    detect at least a portion of the plurality of API endpoints based on a result of the initiated inspection.

18. The system of claim 17, wherein inspection includes:
    generating an inspectable disk; and
    initiating static analysis on the inspectable disk to detect an API endpoint.

19. The system of claim 17, wherein the memory contains further instructions which when executed by the processing circuitry further configure the system to:

detect at least another portion of the API endpoints from runtime events, each runtime event detected by a sensor configured to detect runtime events on a resource.

\* \* \* \* \*